United States Patent
Mennerich et al.

(10) Patent No.: US 9,480,002 B2
(45) Date of Patent: Oct. 25, 2016

(54) SCHEDULING IN COORDINATED MULTI-POINT TRANSMISSION SCHEME

(75) Inventors: Wolfgang Mennerich, München (DE); Wolfgang Zirwas, Munich (DE); Michael Faerber, Wolfratshausen (DE)

(73) Assignee: Nokia Solutions and Networks Oy, Espoo (FI)

( * ) Notice: Subject to any disclaimer, the term of this patent is extended or adjusted under 35 U.S.C. 154(b) by 290 days.

(21) Appl. No.: 14/002,483

(22) PCT Filed: Mar. 3, 2011

(86) PCT No.: PCT/EP2011/053231
§ 371 (c)(1),
(2), (4) Date: Sep. 26, 2013

(87) PCT Pub. No.: WO2012/116756
PCT Pub. Date: Sep. 7, 2012

(65) Prior Publication Data
US 2014/0018071 A1    Jan. 16, 2014

(51) Int. Cl.
*H04W 48/08* (2009.01)
*H04W 48/18* (2009.01)
(Continued)

(52) U.S. Cl.
CPC .............. *H04W 48/08* (2013.01); *H04W 48/18* (2013.01); *H04W 28/08* (2013.01); *H04W 48/14* (2013.01); *H04W 88/02* (2013.01); *H04W 88/08* (2013.01)

(58) Field of Classification Search
CPC .............................. H04W 76/02; H04W 28/16
USPC ................ 455/560, 450–453, 509; 370/395, 370/395.2, 395.21, 395.41, 395.42, 395.43, 370/437, 444
See application file for complete search history.

(56) References Cited

U.S. PATENT DOCUMENTS

| | | | |
|---|---|---|---|
| 2003/0129988 A1* | 7/2003 | Lee | H04W 28/16 455/450 |
| 2004/0125800 A1* | 7/2004 | Zellner | H04W 72/10 370/389 |

(Continued)

FOREIGN PATENT DOCUMENTS

WO    WO 2010125635 A1 *  11/2010  ............. H01Q 1/246

OTHER PUBLICATIONS

Mennerich, W. et al.; "Implementation Issues of the Partial CoMP Concept"; Proceedings of the 21$^{st}$ Annual IEEE International Symposium on Personal, Indoor and Mobile Radio Communications (PIMRC 2010); Istanbul, Turkey; Sep. 2010; pp. 1939-1944.

(Continued)

Primary Examiner — Dung Hong
(74) Attorney, Agent, or Firm — Harrington & Smith

(57) ABSTRACT

Methods, a user equipment, a base station and a computer program product for managing assignments between user equipments and cooperation areas are provided. The present invention discloses receiving, at a base station belonging to a cooperation area, a connection request message from a user equipment to be connected to the cooperation area. The connection request message includes a parameter indicating preference information. It is determined, on the basis of the parameter, whether the user equipment is allowed to connect to the cooperation area. A connection acknowledgement/non-acknowledgement message is forwarded from the base station to the user equipment. The present invention discloses acquiring information about reachable cooperation areas, determining preference information with respect to the reachable cooperation areas, sending a connection request message including preference information to a reachable cooperation area, and selecting the cooperation area to which the connection request message was sent if a connection acknowledgement message is received.

24 Claims, 7 Drawing Sheets

(51) Int. Cl.
  *H04W 28/08*    (2009.01)
  *H04W 48/14*    (2009.01)
  *H04W 88/02*    (2009.01)
  *H04W 88/08*    (2009.01)

(56) References Cited

U.S. PATENT DOCUMENTS

| | | | | |
|---|---|---|---|---|
| 2007/0097862 | A1* | 5/2007 | Moon | H04L 12/5695 370/230 |
| 2007/0230335 | A1* | 10/2007 | Sang | H04L 12/5695 370/230 |
| 2008/0080414 | A1* | 4/2008 | Thubert | H04W 76/022 370/328 |
| 2009/0190553 | A1* | 7/2009 | Masuda | H04W 8/005 370/331 |
| 2012/0087265 | A1* | 4/2012 | Tamaki | H01Q 1/246 370/252 |
| 2012/0196644 | A1* | 8/2012 | Scherzer | H04W 72/02 455/524 |
| 2013/0021962 | A1* | 1/2013 | Hu | H04W 48/20 370/315 |

OTHER PUBLICATIONS

Mennerich, W. et al.; "User Centric Coordinated Multi Point Transmission"; Proceedings of the IEEE 72$^{nd}$ Vehicular Technology Conference (VTC2010-Fall); Ottowa, Canada; Sep. 2010; whole document (5 pages).

Mennerich, W. et al.; "User Centric Scheduling in Cooperative Networks"; Proceedings of the IEEE Middle East Conference on Antennas and Propagation (MECAP 2010); Cairo, Egypt; Sep. 2010; whole document (5 pages).

3GPP TSG-RAN Working Group 1 Meeting #56, Athens, Greece, Feb. 9-13, 2009, R1-090745, "Cell Clustering Clustering for CoMP Transmission/Reception", Nortel, 4 pgs.

3GPP TSG-RAN WG1 Meeting #56bis, Seoul, Korea, Mar. 23-27, 2009, R1-091354, "Setup of CoMP Cooperation Areas": Nokia Siemens Networks, Nokia, 4 pgs.

3GPP TSG-RAN WG1 meeting #57 bis, Los Angeles, USA, Jun. 29-Jul. 3, 2009, R1-092838, "Adaptive Cell Clustering for CoMP in LTE-A", Hitachi Ltd., 6 pgs.

Mennerich, W., et al., "User Centric Coordinated Multi Point Transmission", VTC 2010-Fall, 2010 IEEE 72$^{nd}$, abstrac.

Mennerich, W., et al., "Implementation issues of the partial CoMP concept", PIMRC Sep. 2010 IEEE, abstract.

Mennerich, W., et al., "User Centric scheduling in cooperative networks", MECAP, 2010 IEEE Oct. 2010, abstrac.

* cited by examiner

SCHEDULING IN COORDINATED MULTI-POINT TRANSMISSION SCHEME

FIELD OF THE INVENTION

The present invention relates to the application of cooperative schemes in mobile radio concepts and the optimization of these concepts.

BACKGROUND OF THE INVENTION

Cooperative MIMO (multiple input multiple output) utilizes distributed antennas which encompasses a multitude of cells and sites. On the terminal (UE, user equipment) side, only antennas belonging to the terminal are used. Cooperation improves the performance of a mobile system by exploiting the benefits arising by the use of multiple antennas on different locations. These are diversity, joint transmission, interference cancellation, multi user multiplexing and beam forming. Cooperative concepts are envisaged as an important element to improve the cell edge user experience in frequency reuse 1 layouts, in which the same frequency band is used in adjacent cells/sectors.

The concept of cooperation works best, if the cooperation area (CA) is chosen so large, that all of an UEs strong base stations (BSs)—especially contributors to the cell edge interference—are part of the CA which serves that UE. This is the so called "user centric assignment". Since each UE has an individual set of strongest BSs, fixed and pre-configured CAs can not meet these challenges.

There is a simple trade-off:

Full cooperation is the optimal solution, but not realizable. Hence, the CA must be limited, but as soon as limited CAs are introduced, an interference between them is introduced.

A solution is the already mentioned user centric assignment. This, however, changes the problem into a very low penetration rate and the user centric assignment is hard to realize because of the probability to find a group of UEs with an identical set of strongest BSs and additionally identical to an existing CA is very low.

Documents [1], [2] and [3] mentioned below describe a partial cooperative multi point (partial CoMP, pCoMP) framework.

Document 1: "Wolfgang Mennerich and Wolfgang Zirwas. *Implementation Issues of the Partial CoMP Concept*. In *Proceedings of 21st Annual IEEE International Symposium on Personal, Indoor and Mobile Radio Communications (PIMRC 2010), Istanbul, Turkey, September 2010*".

Document 2: "Wolfgang Mennerich and Wolfgang Zirwas. *User Centric Coordinated Multi Point Transmission*. In *Proceedings of IEEE 72nd Vehicular Technology Conference (VTC2010-Fall), Ottawa, Canada, September 2010*".

Document 3: "Wolfgang Mennerich and Wolfgang Zirwas. *User Centric Scheduling in Cooperative Networks*. In *Proceedings of IEEE Middle East Conference on Antennas and Propagation (MECAP 2010), Cairo, Egypt, September 2010*"

The partial CoMP framework combines huge and overlapping CAs with partial channel reporting to avoid CA-edge UEs and to increase the penetration rate of user centric served UEs drastically with respect to keep the system realizable.

Assignment between UEs and CAs is generally an open issue in CoMP scenarios if it should be done user centric. The challenge is to find CAs which are best fitting to user groups (UGs), that are formed depending on the (pre)defined CAs.

UE-CA assignment is typically done centralized and in a serial way, i.e. an assigned UE(m) influences the conditions for the assignment of UE(m+1), but not the other way around.

However, this approach has several disadvantages.

For example, the optimal CAs might become very huge. It has been observed in simulations using the 3GPP-SCME model (3GPP-SCME, 3rd Generation Partnership Project Spatial Channel Model Extended), that the strongest BSs of an UE can be distributed over several cell sites. Hence, a back-haul network must be installed between all possible members of a CA, but only a part of it will be used later. This, however, leads to a waste of resources.

A further drawback of this approach is that an enormous amount of radio resources is needed for channel reporting because UEs which could be connected to several CAs must report their connectivity values to all of these CAs.

Moreover, if a CA gets to many connect-requests, it must decide which UEs will be served and which not. This is typically negotiated between CAs on the network back-haul.

SUMMARY OF THE INVENTION

According to the present invention, there are provided methods, base stations, user equipments and computer program products for managing assignments between user equipments and CAs.

According to an aspect of the invention there is provided a method comprising:
  receiving, at a base station belonging to a cooperation area, a connection request message from a user equipment to be connected to the cooperation area,
  the connection request message including a parameter indicating preference information the user equipment ascribes being connected to the cooperation area,
  determining, on the basis of the parameter, whether the user equipment is allowed to connect to the cooperation area, and
  forwarding a connection acknowledgement/non-acknowledgement message from the base station to the user equipment.

According to further refinements of the invention as defined under the above aspects
  the method further comprises:
    forwarding of the connection request message from the base station to a central unit of the cooperation area, wherein the central unit determines, on the basis of the parameter, whether the user equipment is allowed to connect to the cooperation area, and
    receiving, at the base station, a connection acknowledgement/non-acknowledgement message from the central unit;
  the step of determining comprises:
    checking if the cooperation area is full,
    sending a connection acknowledgement message if the cooperation area is not full;
  the method further comprises:
    comparing the preference information of the connection request message with preference information of user equipments connected to the cooperation area, if the cooperation area is full, sending a connection non-acknowledgement message if said user equipments indicate a stronger preference than the preference information of the connection request message;

sending a connection acknowledgment message if one or more of said user equipments indicate a weaker preference than the preference information of the connection request message, and sending a disconnection message to one or more of said user equipments indicating a weaker preference than the preference information of the connection request message;

determining, at the base station, load information per cooperation area, and sending the load information from the base station to the user equipment;

wherein the preference information allows the cooperation area to perform a proportional fair granting of received connection requests;

wherein a connection request is preferably granted when the measure of connectivity indicated in the preference information is low and/or no other cooperation area with a higher measure of connectivity is available.

According to another aspect of the invention there is provided a method comprising:

acquiring information about reachable cooperation areas, determining preference information with respect to the reachable cooperation areas, sending a connection request message including preference information to a reachable cooperation area, and selecting the cooperation area to which the connection request message was sent if a connection acknowledgement message is received.

According to further refinements of the invention as defined under the above aspects the method comprises:

determining measures of connectivity to the reachable cooperation area, wherein the preference information is based on the measures of connectivity determined for the reachable cooperation areas;

checking, if the measure of connectivity of a reachable cooperation areas exceeds the measure of connectivity of a currently selected cooperation area;

wherein the connection request message is sent to the cooperation area the measure of connectivity of which exceeds the measure of connectivity of the currently selected cooperation area;

the method is to be performed when:

a new reachable cooperation area is detected, or a predefined time period has lapsed, or connectivity to the selected cooperation area falls below a predetermined threshold;

the determining of measures of connectivity comprises:

receiving load information per reachable cooperation area, and decreasing the measure of connectivity of a cooperation area when the corresponding load information indicates an increase of load in the cooperation area;

According to another aspect of the invention there is provided a base station, comprising:

a transceiver configured to receive a connection request message from a user equipment to be connected to a cooperation area to which the base station belongs, the connection request message including a parameter indicating preference information the user equipment ascribes being connected to the cooperation area, a determining unit configured to determine, on the basis of the parameter, whether the user equipment is allowed to connect to the cooperation area, wherein the transceiver is further configured to forward a connection acknowledgement/non-acknowledgement message from the base station to the user equipment.

According to further refinements of the invention as defined under the above aspects the determining unit is further configured to cause the transceiver to forward the connection request message from the base station to a central unit of the cooperation area, wherein the central unit is configured to determine, on the basis of the parameter, whether the user equipment is allowed to connect to the cooperation area, and the transceiver is further configured to receive a connection acknowledgement/non-acknowledgement message from the central unit and to inform the determination unit of the receives message;

the determining unit is further configured to check if the cooperation area is full, and the transceiver is configured to send a connection acknowledgement message if the cooperation area is not full;

the base station further comprises:

a comparing unit configured to compare the preference information of the connection request message with preference information of user equipments connected to the cooperation area, if the cooperation area is full, wherein the transceiver is configured to send a connection non-acknowledgement message if said user equipments indicate a stronger preference than the preference information of the connection request message;

the transceiver is configured to send a connection acknowledgment message if one or more of said user equipments indicate a weaker preference than the preference information of the connection request message, and the transceiver is configured to send a disconnection message to one or more of said user equipments indicating a weaker preference than the preference information of the connection request message;

the determining unit is further configured to determine load information per cooperation area, and the transceiver is configured to send the load information from the base station to the user equipment;

the preference information allows performing a proportional fair granting of received connection requests;

a connection request is preferably granted when the measure of connectivity indicated in the preference information is low and/or no other cooperation area with a higher measure of connectivity is available.

According to another aspect of the invention there is provided a user equipment, comprising:

an acquiring unit configured to acquire information about reachable cooperation areas, a determining unit configured to determine preference information with respect to the reachable cooperation areas, a transceiver configured to send a connection request message including preference information to a reachable cooperation area, and a selecting unit configured to select the cooperation area to which the connection request message was sent if a connection acknowledgement message is received.

According to further refinements of the invention as defined under the above aspects
the determining unit is further configured to determine measures of connectivity to the reachable cooperation areas, and to determine the preference information based on the measures of connectivity determined for the reachable cooperation areas;
the user equipment further comprises:
a comparing unit configured to check if the measure of connectivity of a reachable cooperation areas exceeds the measure of connectivity of the currently selected cooperation area;
wherein the transceiver is configured to send the connection request message to the cooperation area the measure of connectivity of which exceeds the measure of connectivity of the currently selected cooperation area;
the user equipment is configured to check the measures of connectivity in the comparing unit and to send the connection request message when:
a new reachable cooperation area is detected, or
a predefined time period has lapsed, or
connectivity to the selected cooperation area falls below a predetermined threshold;
the user equipment is further configured to:
receive load information per reachable cooperation area, and
decrease the measure of connectivity of a cooperation area when the corresponding load information indicates an increase of load in the cooperation area.

According to a still further aspect of the invention there is provided a computer program product including a program for a processing device, comprising software code portions for performing the steps of the methods as defined above when the program is run on the processing device.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

With respect to the above and the following description of embodiments of the invention, it is noted that the terms "means" and "units" as used in the description and Figures have the same meaning and are thus interchangeable.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

Figure 1:
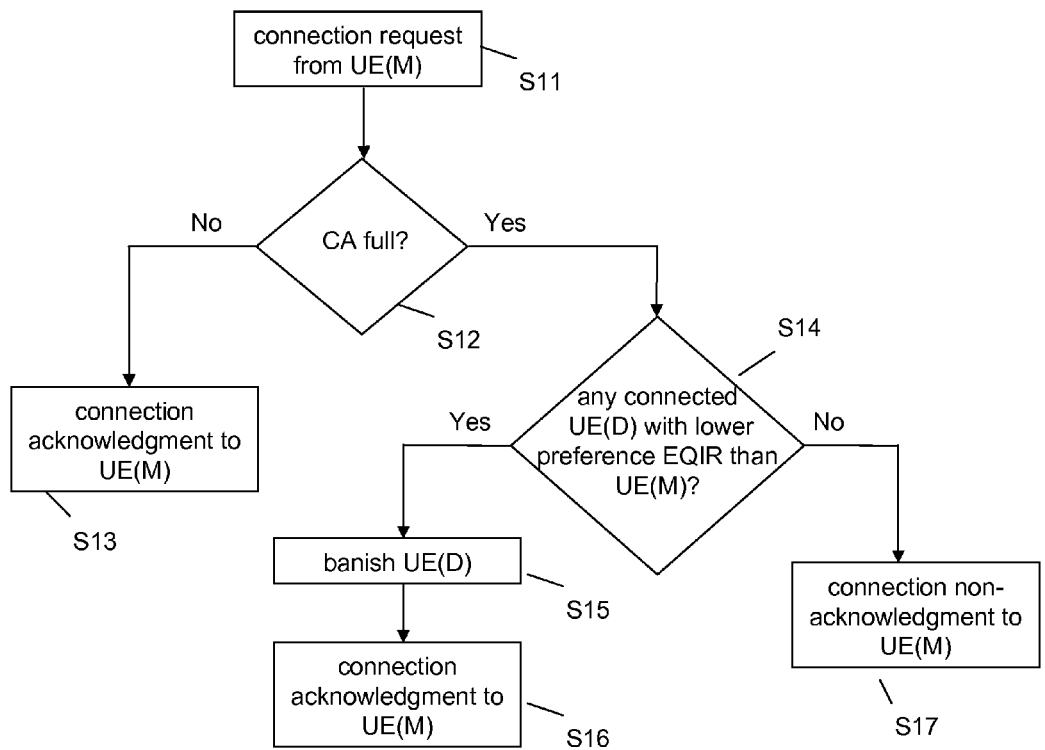
FIG. 1 is a flow chart illustrating the processing at the CA according to an embodiment of the present invention.

In the following, embodiments of the present invention are described by referring to general and specific examples of the embodiments. It is to be understood, however, that the description is given by way of example only, and that the described embodiments are by no means to be understood as limiting the present invention thereto.

The basic idea of Distributed Proportional Fair Assignment (DPFA) is to do the assignment in a distributed manner including assignment requests from UEs into the process. The assignment process is similar like a peer to peer system, rather than having a hierarchical system with a central managing element. This saves a huge amount of channel reporting within a network and back-haul capacity, since UEs create assignment requests depending on preference information which is localized at them, and which may in particular include connectivity values to CAs within their environment. The connectivity value to the CA may be aggregated from the connectivity values of the UE to the BSs in the CA and is a measure for the aggregated channel quality between the UE and the cooperation area, i.e. between the user equipment and the base stations belonging to a cooperation area.

Furthermore, the communication with CAs is done in a more sequential manner, i.e. distributed over the time.

The first applied principle is, to use information where it occurs first. Preference information for a CA based on channel quality measurements, for example, is known at the UE in particular in the downlink.

The second applied principle is to make assignment decisions not at a central point in the network. Instead, all network elements follow the same rules, which will introduce a kind of self-optimization for the CA selection in the network.

The third applied principle is using a proportional fair approach, known from scheduling implementations, in the UE assignment procedure.

This proportional fair approach is advantageously used when a plurality and at least partly overlapping CAs is reachable in a mobile network. In such a scenario the UEs may report connectivity values for several CAs. Some of the UEs may report strong and basically equivalent connectivity values for two or more CAs while other UEs may report a strong connectivity value for only one CA. The proportional fair approach may favor UEs which report a strong connectivity value for only one CA in the assignment procedure. Therefore the proportional fair approach may ensure that an UE with only one strong connectivity value is assigned to the preferred CA, i.e. the CA for which the UE reports a high connectivity value.

The assignment procedure may not only reject access requests from UEs reporting strong connectivity values for at least two CAs in favor of access requests of UEs reporting a strong connectivity value for only one CA, but may even withdraw previously granted access rights to a CA from UEs reporting strong connectivity values for this CA and at least one other CA in favor of a new access request received from a UE which reports a strong connectivity value for only this CA. Withdrawing of previously granted access rights to a CA from UEs is the following also referred to as 'banishing UEs'.

The proportional fair approach may additionally ensure that an UE reporting only low connectivity values, is more likely assigned to its preferred CA (the CA for which it reports the strongest connectivity value) than a UE which is reporting rather strong connectivity values for several CAs.

The proportional fair approach may further ensure that a CA rejects connection requests of UE or withdraws granted access right from UEs in favor of connection requests or access rights of UEs which would experience a more severe performance degradation when being rejected or disconnected from that CA. The preference information reported by the UEs to a CA may therefore not only indicate the connectivity value for this CA but may also indicate the connectivity values of other CAs reachable for the UE or a measure of the performance degradation the UE would experience when it is rejected or disconnected from the CA.

In contrast to most conventional methods, an embodiment of the present invention contains the innovative step to handle CAs with different sizes as well as overlapping CAs. The proposed innovative step solves the previous mentioned issues without compromising the channel information quality and the CA selection as such.

Since overlapping CAs are supposed to increase the penetration rate of user centric served UEs drastically, the invention meets future demands in partial CoMP scenarios, which are described in documents [1], [2] and [3], for example, as mentioned above.

The core idea of the present invention is to do the decision distributedly. The UEs acquire so called "CA Index Sets" (CAISs), which are broadcast by the BSs. Each CAIS corresponds to a set of BSs which are able to form a CA. Since CAs can be overlapping, a BS can be a member of different CAs (see also "shifted CAs" in document [2]). By receiving CAISs a UE acquires information about CAs which are available or reachable for the UE.

The UEs determine measures of connectivity to the reachable CAs. The UEs may for instance calculate an "Extended Quality Indicator" (EQI) based on channel quality measurements (very similar to the usual wideband Channel Quality Indicator) from all receivable BSs for each CA which can be assembled from the receivable BSs. EQI may for instance correspond to the sum of wideband connectivity to all BSs that contribute to the corresponding CA.

The UE ranks the detected CAs in lists with respect to the obtained EQIs. Hence, entry CA(1) in an CA list of the UE is the CA which has the best EQI of all detected CAs, i.e. it has the strongest connectivity to that UE. Entry CA(2) has the second strongest connectivity, and so on.

UEs try to connect to their best CA and may send a so called "connect-request" together with some preference information indicating the priority the UE attributes an assignment to the CA.

The CA may comprise a serving BS and a set of client BSs. The serving BS may comprise a central unit (CU), which is for instance in charge of connecting and disconnecting of UEs to/from the CA. When a UE wants to connect to a CA the UE may send a connect request to the CA. The UE may send its connect request to one or more BSs in the CA and client BSs may forward the received connect requests via a backhaul network to the CU or to the serving BS in the CA.

Alternatively, the BSs receiving a connect request from a UE may respond to the request directly. In this case the CU may provide the BSs in the CA with required policy, load or control information which ensures a consistent behavior of the BSs in the CA concerning the UE assignment procedure. The BSs may inform the CU about the outcome of received and processed connect requests.

The CU need not be a separate network element but the respective functionality may be implemented in a BS of the CA.

A UE may communicate in uplink with a CA by transmitting messages to one or more BSs of the CA. The BSs in the CA may forward at least a part of the received uplink messages to the CU of the CA.

The UE may communicate in downlink with a CA by receiving messages from one or more BSs of the CA. The BSs in the CA may receive at least a part of the downlink messages from the CU in the CA.

It is proposed that UE try to connect to the best available CA by transmitting a connect request in uplink which includes appropriate preference information indicating the priority the UEs ascribe an assignment to this CA.

The UE may include in the connect-request to a CA the so called "Extended Quality Indicator Ratio" (EQIR) as a preference information. According to an embodiment of the present invention, the EQIR can be defined in different ways.

For example, the EQIR can be defined such that EQIR(N)=EQI(N) and the assignment procedure favors requests from UEs indicating a low connectivity value EQI(N). This behavior is known from algorithms for proportional fair scheduling.

The above definition for EQIR contains a preference information for the N-th CA which receives the connection request but does not comprise any indication of the UE's preference for the (N+1)-th or any following CA as a measure for the expected performance degradation experienced by the UE after rejection or disconnection. A suitable definition of EQIR may therefore read EQIR(N)=EQI(N+1)/EQI(N).

By applying this definition, UE u is unlikely to be rejected or disconnected from the N-th CA and routed to its (N+1)-th CA when the connectivity value for UE u in the (N+1)-th CA is significantly lower than the connectivity value in the N-th CA. This definition indicates an expected performance degradation through the ratio in EQIR but does no longer consider an absolute measure for the connectivity to the N-th or the (N+1)-th CA. A further extension of the definition may therefore read EQIR(N)=EQI(N+1)$^2$/EQI(N).

In this definition the additional scaling with EQI(N+1) of the ratio EQI(N+1)/EQI(N) adds a stronger proportional fair component to the assignment procedure, i.e. UEs reporting a low connectivity measure EQI for the (N+1)-th CA are less likely to be rejected or disconnected from the N-th CA.

Based on the EQIR, the CA receiving a connect request knows a measure, which indicates the preference of the requesting UE for being assigned to the CA. A strong preference will indicate that the UE cannot be assigned to another CA without severe performance degradation for the requesting UE. For the above definitions a high preference EQIR is indicated through a low EQIR value and a low preference EQIR is indicated through a high EQIR value.

In other words, a high preference EQIR (low EQIR value) for the N-th CA signals that the UE would suffer strongly from not being assigned to the N-th CA, either since the UE exhibits a low EQI even for the N-th CA, or since there is no other basically equivalent CA with similar EQI reachable for the UE.

A CA may receive more connect-requests than the number of UEs it can serve. In that case, the CA can reject the requesting UEs or it may disconnect, i.e. "banish", an already connected UE which would not suffer as much from being assigned to its (N+1)-th CA as the requesting UE from being rejected.

The EQIR values allow for checking in the assignment procedure of a CA which UEs would suffer most from being rejected. The CA may compare the EQIR values of the requesting UEs with EQIRs of the already connected UEs and the CA may withdraw a previous access grant from a connected UE, i.e. banish it, which has a lower preference EQIR than the requesting UE. The UE which has lost access rights to its CA will try to connect to a new CA. The UE may for a certain time window omit sending connect requests to the CA from which it was banished in order to avoid repeated access grant/withdraw loops.

With a high number of UEs assigned to it and many UEs requesting high data throughput a CA may reach some capacity limitations which may compromise the service quality experienced by UEs in the CA. A CA approaching such capacity limitations may therefore initiate a procedure for offloading data traffic.

The BSs may therefore not only broadcast the CAIS, but may also signal a scaling factor per CA which is related to the current load situation in the CA. The UEs may acquire these scaling factors and may use them when calculating the EQIR values. A low scaling factor indicating a high load in a CA leads to a lower connectivity measure (EQI value) of the CA and the CA is less likely to receive connect-requests from UEs and UEs assigned to the CA may perform reselection procedures in order to get connected to a better CA.

A UE can try to connect to a better CA by performing a connection enhancement procedure. The UE may contain a connection enhancement timer, which triggers in certain time intervals (e.g. every 10 seconds) a connection enhancement procedure, in which the UE compares the EQIs of reachable CAs with the EQI of the CA, it is connected to, i.e. its "current EQI" (cEQI) and sends a connection request to a new CA, if the EQI for the new CA exceeds the connectivity measure cEQI for the current CA.

An UE may perform a connection enhancement procedure not only in regular intervals but may perform the procedure in an event-triggered way when the UE detects a new CA or when the UE has been "banished" from its CA, i.e when the UE has lost the access right to its CA. A banished UE or any UE which is currently not assigned to any CA may set its cEQI value to the minimum value of zero during initialization of the connection enhancement procedure.

Further, the connection enhancement procedure may be performed when the connectivity, i.e. the cEQI, to the selected cooperation area falls below a predetermined threshold, which is greater than zero. This also includes the cases of a banished or not yet connected UE, which sets its cEQI to zero, since this cEQI also falls below the threshold and thus, the connection enhancement procedure is started.

The continuous execution of assignment procedures and connection enhancement procedures will lead to an adaptive assignment of UEs to the CAs such that the system approximates a state with optimum cooperation gain under the constraint that all UEs must be served by a CA and UEs with low connectivity values are favored in the assignment procedure.

This adaptive assignment of UEs to CAs is achieved in a way in which much of the processing is performed distributedly in the UEs by evaluating a connectivity measure for the reachable CAs, ranking of the reachable CAs based on the obtained connectivity measures, determining of a preference information for reachable CAs, triggering of connection enhancement procedures etc. Hence, much of the processing is done in the UEs based on locally available information. An equivalent centralized approach would require the exchange of much of this information between neighboring CAs. Therefore the proposed distributed and UE-based approach saves network resources on the radio interfaces between the UEs and BSs and on the backhaul network between the BSs and the CUs of neighboring CAs.

In the following, examples of an algorithm performed at the CA and the UE according to an embodiment of the present invention are described.

First it is noted that each UE has acquired and maintains a list of reachable or detected CAs comprising index sets which specify the BSs in those CAs. Additionally, each UE calculates the wideband connectivity to all relevant BSs in its environment and calculates the respective EQI for each CA. A UE sends a connect request message including the EQIR to its most preferred CA, i.e. the CA for which it obtained the best EQI.

A requested CA grants access to UEs which the CA can jointly serve (e.g. according to the number of antennas at the CA side). If more candidates are requesting admission than the CA can handle, it chooses the UEs with the highest preference EQIRs. All other UEs are rejected. This includes also already connected UEs. Hence, an already connected UE can be 'banished' from the CA because the CA has to serve another UE which indicates a higher preference EQIR for the CA.

All rejected and banished UEs start a 'connect-request' to their (N+1)-th CA in the set of reachable CAs. The connect request message include in particular the EQIR for the (N+1)-th CA. The procedure is repeated until all UEs are connected. A banished UE starts a connection enhancement procedure with N=1.

The above described algorithm with respect to the CA will now be described in more detail with reference to FIG. 1.

FIG. 1 is a flow chart illustrating the processing at the CA according to an embodiment of the present invention.

As shown in FIG. 1, in a step S11, the CA receives a connection request from one of a plurality of UEs, namely, UE(M). In step S12, it is checked whether the CA is full, that is, whether the CA can still serve one more UE. If it is determined in step S12 that the CA is not yet full, i.e. that the CA can serve the requesting UE(M), the CA sends a connection acknowledgement message to the UE(M) in step S13. Thus, the UE(M) is informed that it is connected at the requested CA.

Otherwise, if it is determined in step S12 that the CA is full, it is checked in a step S14 whether there is any already connected UE, which has a lower preference EQIR than the UE(M) that is currently requesting the connection to the CA. If it is determined in step S14, that there is a UE(D) having a lower preference EQIR than the UE(M), the UE(D) is banished from the CA in a step S15. That is, the UE(D) is disconnected from the CA by a respective disconnection message. Then, in a step S16, a connection acknowledgement message is sent to the UE(M).

However, if it is determined in step S14 that there is no UE which has a lower preference EQIR than UE(M) that has requested connection to the CA, the CA sends a connection non-acknowledgement message to the UE(M). Thus, the UE(M) is informed that it cannot be connected to the requested CA.

Next, the above described algorithm with respect to the UE will be described in more detail with reference to FIG. 2 which shows how a UE can select a cooperation area, i.e. how a UE can connect to a cooperation area.

Figure 2:
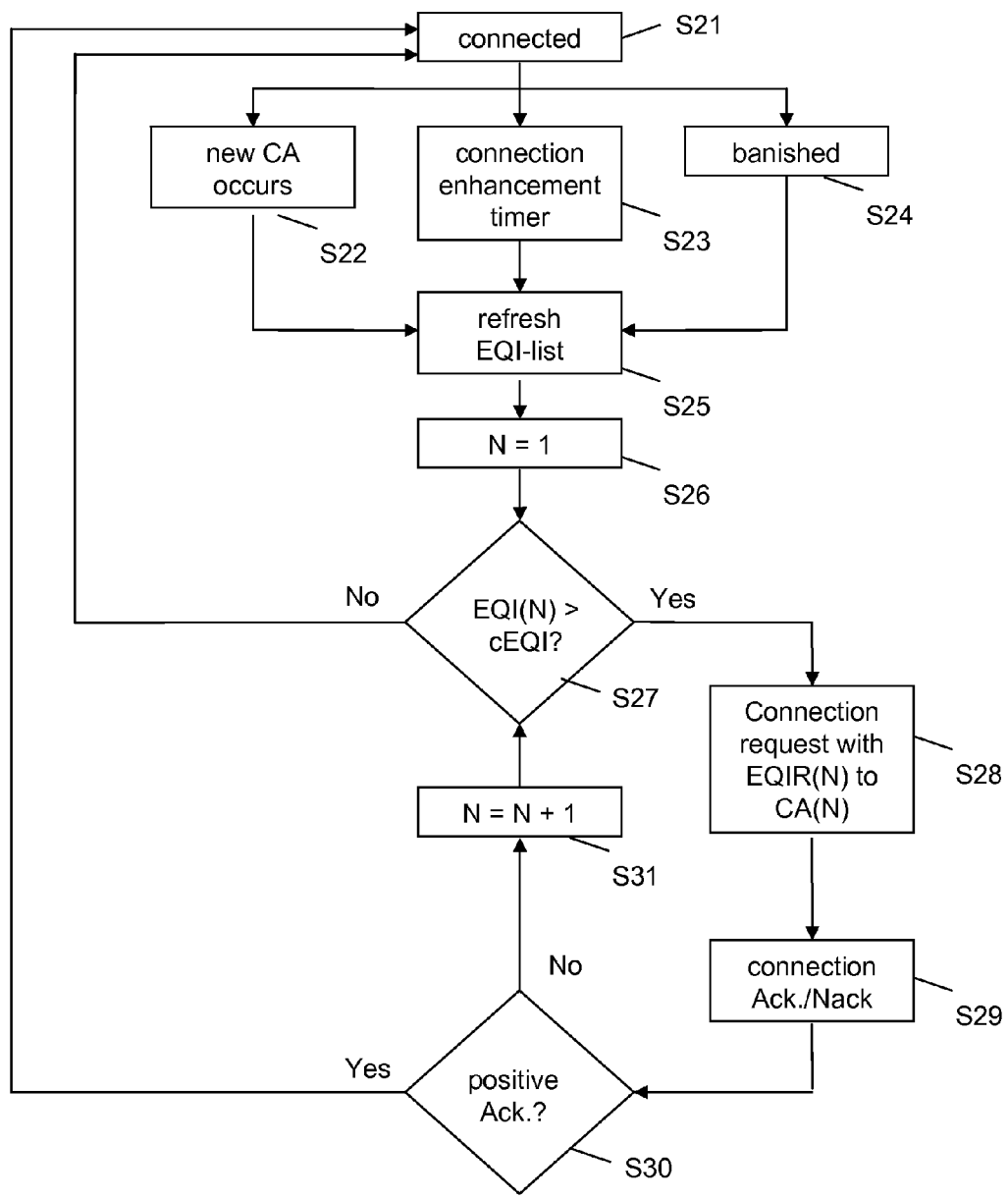
FIG. 2 is a flow chart illustrating the processing at the UE according to an embodiment of the present invention.

FIG. 2 is a flow chart illustrating the processing at the UE according to an embodiment of the present invention.

The procedure shown in FIG. 2 starts at a step S21 in a case in which the UE has selected a CA, i.e. the UE is connected to a certain CA. Then, there are described three scenarios which can occur such that the UE is triggered to refresh its EQI-list.

In a step S22, the UE has moved to a new position and the UE has detected a new CA. In a step S23 there is described the case in which a connection enhancement timer (e.g. 10 seconds) has lapsed and the UE tries to connect to a better CA. Step S24 illustrates in particular the case in which the UE has been banned from a CA, as described above, because a UE with a higher preference EQIR has requested connection to that CA. But S24 is the starting point of a UE in the connection enhancement procedure for selecting a CA when the UE is not connected to any CA.

From any one of these steps S22, S23 and S24, the procedure proceeds to step S25, in which the UE refreshes its EQI-list. The refreshing of the EQI-list comprises adding the EQI values of new, previously undetected cooperation areas, removing of EQI values of cooperation areas which have faded away and ranking of cooperation areas according to the determined EQI values. The cooperation area with the best/highest connectivity measure (EQI) is ranked on position N=1 in the list. Then, in a step S26, N is set to 1 and in the following step S27, the UE compares the CA with the best EQI with the EQI of its current CA, i.e. the CA to which it is currently connected. Namely, the UE compares the EQI(1) of the CA(1) with the cEQI of the current CA.

If it is determined in step S27, that EQI(1) does not exceed cEQI (NO in step S27), the procedure gets back to step S21 and the UE remains connected with its current CA.

However, in case it is determined in step S27 that EQI(1) is higher than cEQI (YES in step S27), the procedure proceeds to step S28 and the UE sends a connection request to CA(1) with EQIR(1).

Then, the procedure for the CA shown in FIG. 1 is started, as described above and the CA returns an acknowledgement message or a non-acknowledgement message to the UE. The UE receives the respective message in step S29 of FIG. 2.

In step S30, it is determined whether the message received in step S29 is an acknowledgement message or a non-acknowledgement, i.e. whether connection to CA(N) is accepted or not.

If it is determined in step S30 that a positive acknowledgement message is received, the procedure goes to step S21 and the UE is connected to CA(N).

Otherwise, if a non-acknowledgement message has been received in step S29 and this has been determined in step S30, then N is incremented by 1 in step S31 and the procedure gets back to step S27, in which a connection request is sent to the second strongest CA.

If it is determined in step S27, that EQI(N) does not exceed cEQI (NO in step S27), the procedure gets back to step S21 and the UE remains connected with its current CA.

However, in case it is determined in step S27 that EQI(N) is higher than cEQI (YES in step S27), the procedure proceeds to step S28 and the UE sends a connection request to CA(N) with EQIR(N).

This procedure is then repeated until the procedure gets back to step S21 after the query in step S27 or after the query in step S30.

It is to be noted that if the UE has been banned from its current CA (step S24), the UE may set the current EQI to zero such that the result of the check in step S27 will be YES and the procedure will proceed with step S28.

Another explanation of an embodiment of the present invention will now be made with respect to FIGS. 3 and 4.

Figure 3:
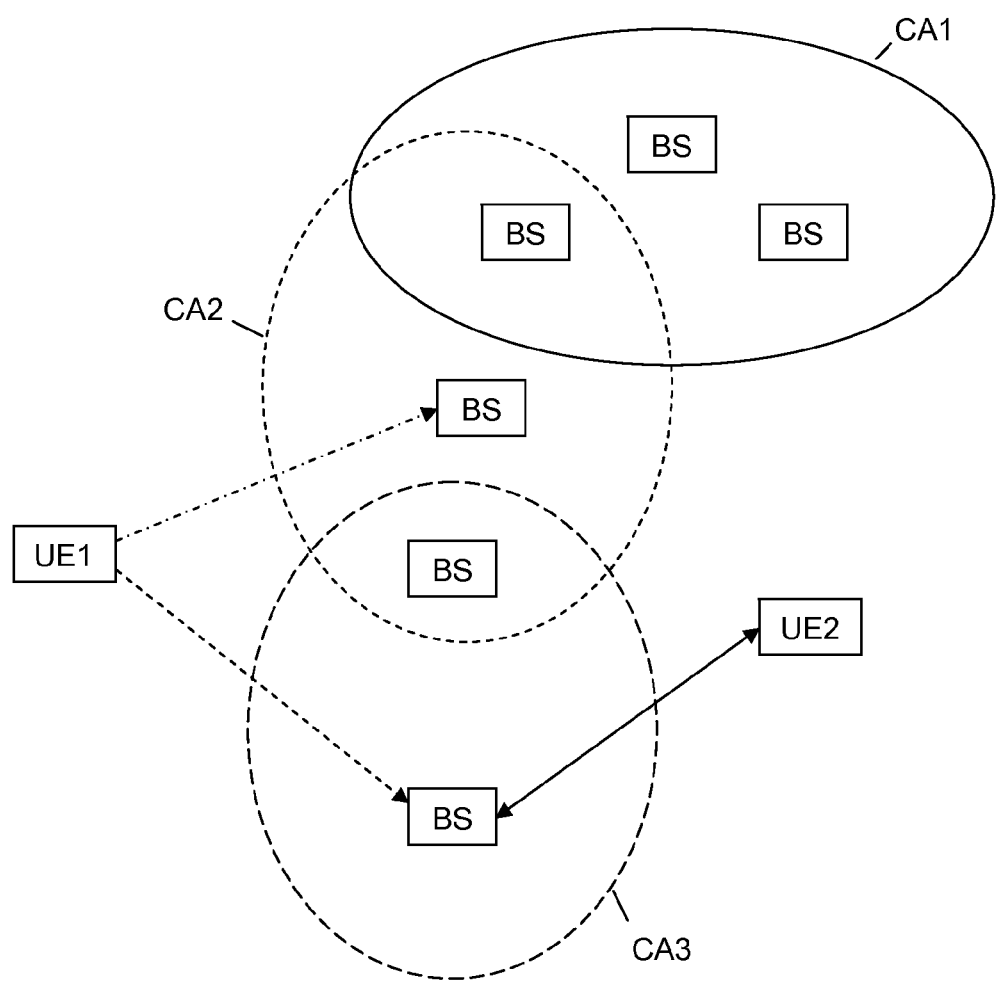
FIG. 3 shows an example of an assignment between user equipment and cooperation areas according to an embodiment of the present invention.

FIG. 3 shows an example of three cooperation areas CA1 to CA3 according to an embodiment of the present invention. According to FIG. 3, CA1 and CA2 are each constituted by three base stations and CA3 consists of two base stations. However, it is to be noted that this is merely an example and any suitable number of base stations can build up a cooperation area. The base stations of the CAs are connected via a backhaul network (not shown in FIG. 3) to the CUs (not shown in FIG. 3).

Further, there are shown two user equipments UE1 and UE2. According to FIG. 3, UE2 is currently connected to CA3 and UE1 is requesting connection firstly to CA2, and then to CA3.

Figure 4:
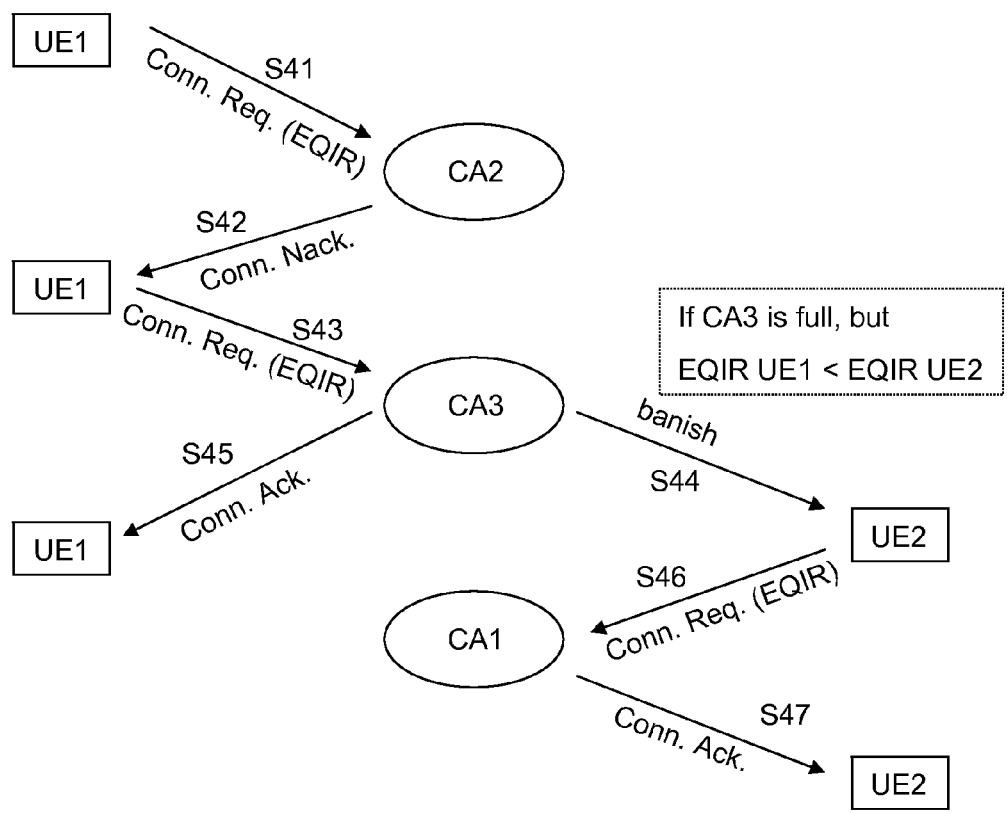
FIG. 4 shows a signaling diagram according to an embodiment of the present invention.

FIG. 4 shows a signaling diagram according to an embodiment of the present invention.

In step S41, UE1 sends a connection request message including its EQIR to one or more of the base stations of CA2. According to this example, CA2 is already full and thus, CA2 responds with a connection non-acknowledgement message in step S42. Then, in step S43, a connection request message is sent from UE1 to one or more base stations of the second strongest cooperation area, here CA3. A UE may transmit its current EQIR value to the CA it is connected to in regular intervals or on request by for instance a BS of the CA. In this example, it is assumed that also CA3 is already full, but UE1 has reported a higher preference EQIR than UE2, which is connected to CA3. In such a case, as already described above, UE2 is banned from CA3 in step S44 and instead, UE1 having the higher preference EQIR is connected to CA3 and receives a connection acknowledgement message from CA3 in step S45.

After being banned from CA3, UE2 then tries to connect to another cooperation area and thus, sends a connection request message to its second strongest CA1 in step S46. Assuming that CA1 is not yet full, UE2 then gets connected to CA1 by receiving a connection acknowledgement message in step 47.

Figure 5:
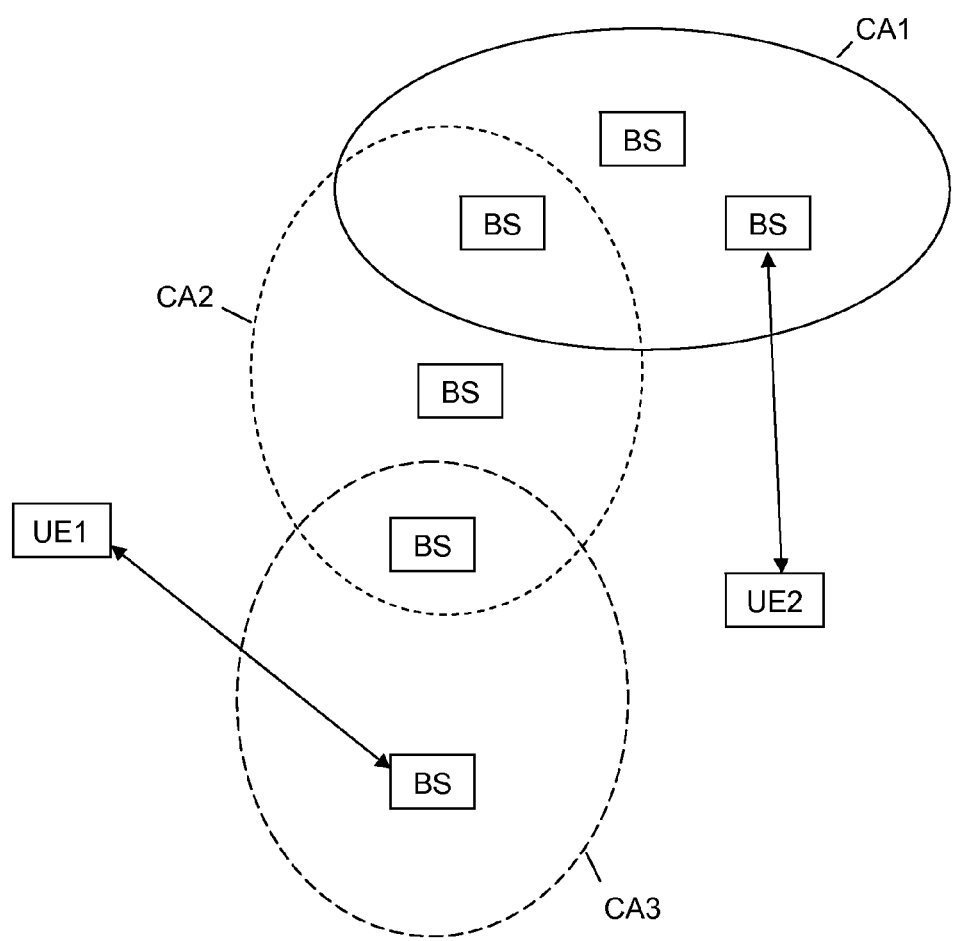
FIG. 5 shows another example of an assignment between user equipment and cooperation areas according to an embodiment of the present invention.

FIG. 5 shows the scenario of the cooperation areas CA1 to CA3 and user equipments UE1 and UE2 after the processing shown in FIG. 4 has been performed. Thus, according to FIG. 5, UE1 is now connected to CA3 and UE2 is connected to CA1.

Figure 6:
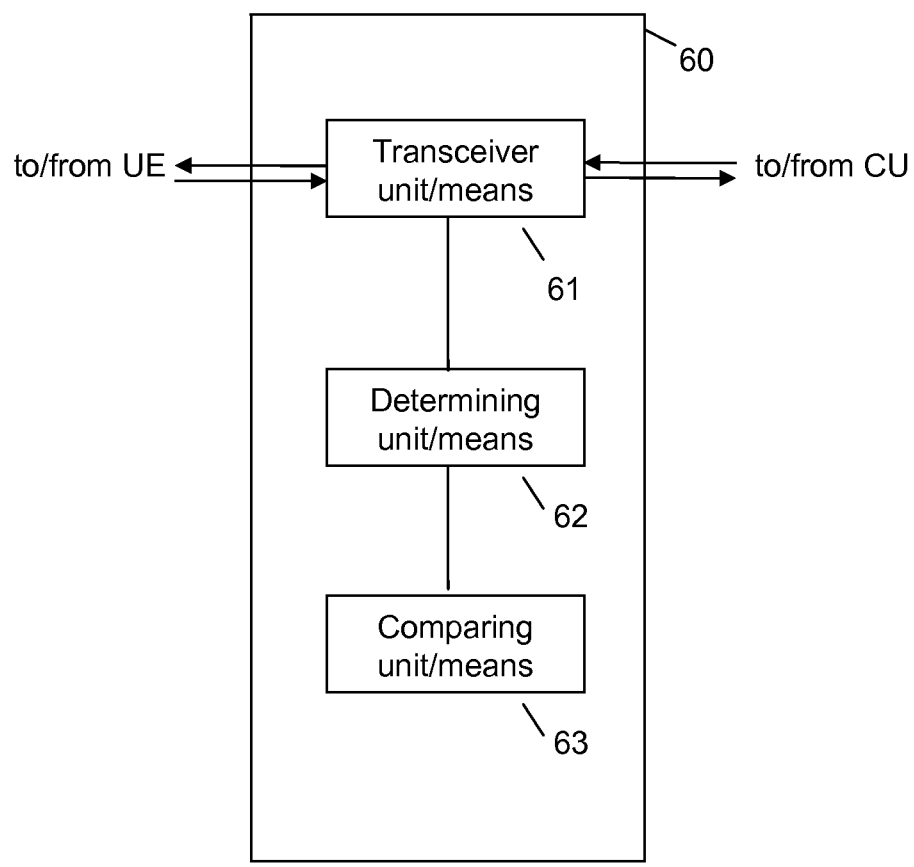
FIG. 6 is as block diagram showing an example of a base station according to an embodiment of the present invention.

FIG. 6 is as block diagram showing an example of a base station according to an embodiment of the present invention.

According to FIG. 6, the base station 60 comprises a transceiver 61. The transceiver 61 is configured to receive messages like e.g. a connection request message from any user equipment and to send messages like e.g. a connection acknowledgement message to the user equipment. Instead of transceiver 61, also a separate receiver and a separate transmitter could be used alternatively. Further, the base station comprises a determining unit 62 which is connected to the transceiver 61. The determining unit 62 determines whether the user equipment, which has requested to be connected to the base station, is allowed to be connected.

For example, it is determined whether the base station and the cooperation area to which it belongs have enough capacity for serving the requesting user equipment. Further, if there is not enough capacity, it is determined whether the requesting user equipment has a higher preference EQIR than any user equipment which is already connected to the base station. This is done by a comparing unit 63 connected to the determining unit 62. The determining unit 62 may also be configured to determine a load-related scaling factor, which is then transmitted to the user equipment via the transceiver 61. This scaling factor is related to the aggregated load information in the cooperation area and the base stations may receive the scaling factor from the central unit of the cooperation area.

The transceiver 61 is connected via an interface to a backhaul network with the central unit of the cooperation area. The transceiver 61 may forward a received connect request, comparison results from unit 63 related to the connect request and local load information via the backhaul network to the central unit and may receive from the central unit a connect acknowledged/non-acknowledged message in response to the connect request of the user equipment.

Alternatively, the transceiver 61 may receive from the central unit of the cooperation area control information concerning the assignment of user equipments to the cooperation area and aggregated load information of the cooperation area. The control information from the central unit may for instance include information characterizing the distribution of EQIR values of user equipments currently assigned to the cooperation area. In the simplest case this may be the highest EQIR value (lowest preference EQIR) of the user equipments currently assigned to the cooperation area, or the central unit may provide a threshold EQIR which is exceeded by a predefined percentage of the user equipments in the cooperation area, or the central unit may for instance provide moments or central moments of the distribution of the EQIR values. The base stations may based on this information directly decide upon received access requests and the signaling of access acknowledged/non-acknowledged messages. The base stations in turn forward access grants for a user equipment and its EQIR value to the central unit of the cooperation area which allows the central unit to update the distribution of the EQIR values in the cooperation area.

In the above described example, the determining unit 62 determines whether the user equipment, which has requested to be connected to the base station, is allowed to be connected. However, it is noted that this determination could also be done in a central unit (CU) of the cooperation area which communicates with the base station 60. In such a case, the determination unit 62 of the base station causes the transceiver 61 of the base station to forward the connection request message from the UE to the CU. Then, some or all determinations are performed in the CU and the transceiver 61 receives the result of the determination from the CU and informs the determining unit 62 of the result. Thus, the determining unit 62 is not only a unit that performs the determination by itself, but also a unit that is capable of requesting the determination to be performed by another entity, such as the CU.

Figure 7:
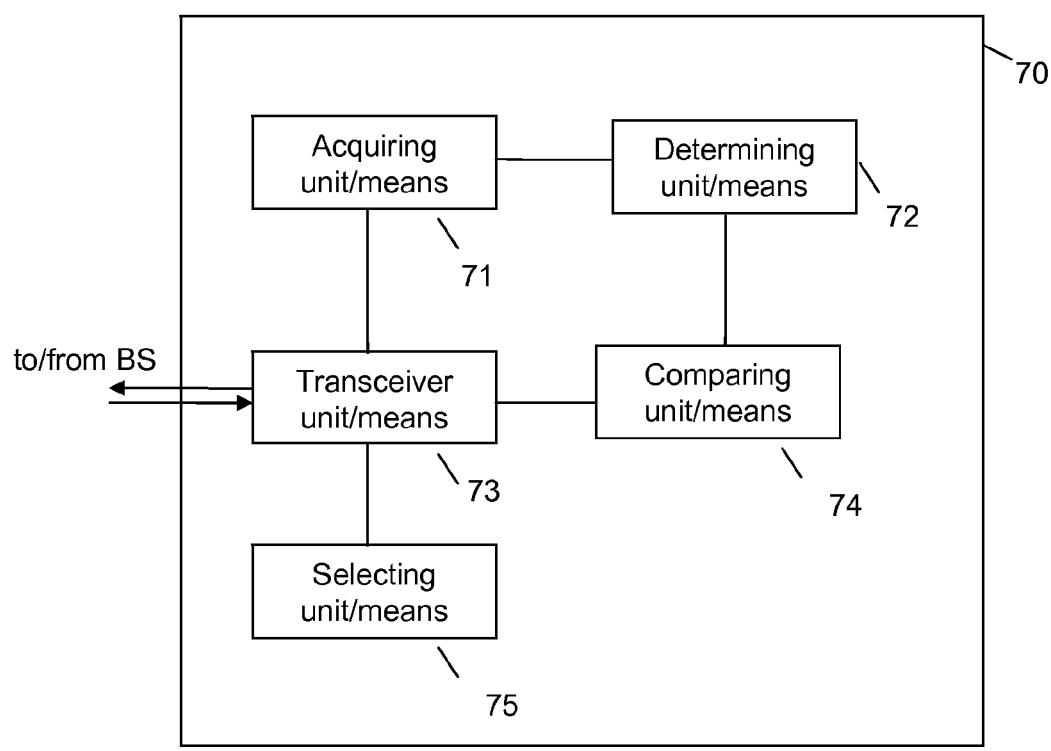
FIG. 7 is as block diagram showing an example of a user equipment according to an embodiment of the present invention.

FIG. 7 is as block diagram showing an example of a user equipment according to an embodiment of the present invention.

The user equipment 70 comprises an acquiring unit 71 for acquiring information about reachable cooperation areas. The user equipment further comprises a determining unit 72 connected to the acquiring unit which determines connectivity measures and preference information with respect to the reachable cooperation areas. The user equipment further comprises comparing unit 74 which compares the connectivity measures of the reachable cooperation areas. Moreover, a composition unit (not shown) for composing a connection request message to be sent to the base stations is included in the user equipment 70. The composition unit includes into the message the EQIR of the respective cooperation area to which the message is sent. This cooperation area is selected based on a result of a comparison by the comparing unit 74.

Then, a transceiver 73 connected to the composition unit sends the message to one or more of the base stations of the cooperation area. The transceiver 73 receives the response from one or more of the base stations of the cooperation area. If the user equipment receives a connection acknowledged message, a selecting unit 75 connected to the transceiver 73 selects the cooperation area to which the connection request message was sent and the connection between the cooperation area and the user equipment is established. If the connection request message has not been acknowledged, the user equipment composes another connection request message to the second strongest cooperation area, in terms of the applied connectivity measure and as determined by the comparing unit 74, including the EQIR with respect to this cooperation area by means of the composition unit and sends this message to one or more base stations of the cooperation area via the transceiver 73 and repeats this processing until an acknowledgement is received. Further, the user equipment may comprise a measuring unit (not shown) connected to the determining unit 72 and the transceiver 73. The calculation of the connectivity measure can additionally be based on a load-related scaling factor received via the transceiver 73 from the base station.

In the foregoing exemplary description of the user equipment and the base station, only the units that are relevant for understanding the principles of the invention have been described using functional blocks. The user equipment and the base station may comprise further units that are necessary for its respective operation. However, a description of these units is omitted in this specification. The arrangement of the functional blocks of the devices is not construed to limit the invention, and the functions may be performed by one block or further split into sub-blocks.

The above described solution according to an embodiment of the present invention has the following advantages with respect to the known solutions.

The present invention enables a full exploitation of the potential in CoMP scenarios. That is, UEs which have similar connectivity to several CAs, (typically CA edge UEs) will be distributed between all CAs which can be used without a strong loss of capacity. Further, UEs with good connectivity to only a single CA will be preferably served from that CA.

As a further matter, the above described solution is directed to CAs instead of BSs. Thus, the UE cares about all BS in the CA and not only the strongest one. Each UE gets this advantage, not only the initially assigned UE.

Another advantage of the proposed solution according to an embodiment of the present invention is, that it is always feasible. Thus, the penetration rate is 100%.

Moreover, it is flexible and extensible. It can also be used in non cooperative networks, i.e. CAs with size 1, and it handles arbitrary patterns of CAs, that is, overlapping and non overlapping, irrespective whether they are operating in same or different resources.

Additionally, the processing is highly distributed. An assignment depends on all UEs and CAs of the system. Such dependencies normally are realized with a central unit which has to gather certain assignment parameters like the EQIR values from all UEs. However, this "back-haul flooding" is avoided by the present invention.

For the purpose of the present invention as described herein above, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and user equipments, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
receiving, at a base station belonging, together with at least one further base station, to a cooperation area for cooperative multiple input multiple output communication of the base station and the at least one further base station with at least one user equipment, a connection request message from a requesting user equipment to be connected to the cooperation area,
wherein the connection request message includes a parameter indicating cooperation area specific preference information the requesting user equipment ascribes being connected to the cooperation area, and
wherein the preference information comprises information indicative of a measure of aggregated channel quality between the requesting user equipment and the base station and the at least one further base station;
determining, on the basis of the parameter, whether the requesting user equipment is allowed to connect to the cooperation area;
forwarding a connection acknowledgement/non-acknowledgement message from the base station to the requesting user equipment.

2. The method according to claim 1, further comprising:
forwarding of the connection request message from the base station to a central unit of the cooperation area, wherein the central unit determines, on the basis of the parameter, whether the requesting user equipment is allowed to connect to the cooperation area; and
receiving, at the base station, a connection acknowledgement/non-acknowledgement message from the central unit.

3. The method according to claim 1, wherein the step of determining comprises:
checking if the cooperation area is full,
sending a connection acknowledgement message if the cooperation area is not full.

4. The method according to claim 3, further comprising:
comparing the preference information of the connection request message with preference information of user equipments connected to the cooperation area; and
sending, if the cooperation area is full, a connection non-acknowledgement message if said user equipments indicate a stronger preference than the preference information of the connection request message.

5. The method according to claim 4, further comprising:
sending a connection acknowledgment message if one or more of said user equipments indicate a weaker preference than the preference information of the connection request message; and sending a disconnection message to one or more of said user equipments indicating a weaker preference than the preference information of the connection request message.

6. The method according to claim 1, further comprising:
determining, at the base station, load information per cooperation area, and
sending the load information from the base station to the requesting user equipment.

7. The method according to claim 1, wherein the preference information allows the cooperation area to perform a proportional fair granting of received connection requests.

8. A computer program product comprising a non-transitory computer-readable storage medium bearing computer program code embodied therein for use with a computer, the computer program code comprising code for performing or controlling the method of claim 1.

9. A method comprising:
acquiring information about one or more reachable cooperation areas;
determining cooperation area specific preference information with respect to the one or more reachable cooperation areas;
sending a connection request message including preference information to one of the one or more of the cooperation areas; and
selecting the one cooperation area to which the connection request message was sent if a connection acknowledgement message is received,
wherein the one cooperation area comprises two or more base stations for cooperative multiple input multiple output communication between the two or more base stations with at least one user equipment, and
wherein the preference information comprises information indicative of a measure of aggregated channel quality between a user equipment sending the connection request message and the two or more base stations.

10. The method according to claim 9, further comprising,
checking, if the measure of connectivity of one other of the one or more reachable cooperation areas exceeds the measure of connectivity of the one selected cooperation area,
wherein the connection request message is sent to the one other cooperation area the measure of connectivity of which exceeds the measure of connectivity of the one selected cooperation area.

11. The method according to claim 10, to be performed when:
a new reachable cooperation area is detected, or
a predefined time period has lapsed, or
the measure of connectivity to the one selected cooperation area falls below a predetermined threshold.

12. The method according to claim 9, wherein the determining cooperation area specific preference information with respect to the one or more reachable cooperation areas comprises;
receiving load information per cooperation area of the one or more reachable cooperation area; and
decreasing the measure of connectivity of the one selected cooperation area when the corresponding load information indicates an increase of load in the one selected cooperation area.

13. A computer program product comprising a non-transitory computer-readable storage medium bearing computer program code embodied therein for use with a computer, the computer program code comprising code for performing or controlling the method of claim 9.

14. A base station, comprising:
a transceiver configured to receive a connection request message from a requesting user equipment to be connected for cooperative multi input multi output communication to a cooperation area to which the base station, together with at least one further base station, belongs,
wherein the connection request message includes a parameter indicating cooperation area specific preference information the requesting user equipment ascribes being connected to the cooperation area, and
wherein the preference information comprises information indicative of a measure of aggregated channel quality between the requesting user equipment and the base station and the at least one further base station; and
a determining unit configured to determine, on the basis of the parameter, whether the requesting user equipment is allowed to connect to the cooperation area,
wherein the transceiver is further configured to forward a connection acknowledgement/non-acknowledgement message from the base station to the requesting user equipment.

15. The base station according to claim 14, wherein
the determining unit is further configured to cause the transceiver to forward the connection request message from the base station to a central unit of the cooperation area, wherein the central unit is configured to determine, on the basis of the parameter, whether the requesting user equipment is allowed to connect to the cooperation area, and
the transceiver is further configured to receive a connection acknowledgement/non-acknowledgement message from the central unit and to inform the determination unit of the received message.

16. The base station according to claim 14, wherein
the determining unit is further configured to check if the cooperation area is full, and
the transceiver is configured to send a connection acknowledgement message if the cooperation area is not full.

17. The base station according to claim 16, further comprising:
a comparing unit configured to compare the preference information of the connection request message with preference information of user equipments connected to the cooperation area, if the cooperation area is full,
wherein the transceiver is configured to send a connection non-acknowledgement message if said user equipments indicate a stronger preference than the preference information of the connection request message.

18. The base station according to claim 17, wherein
the transceiver is configured to send a connection acknowledgment message if one or more of said user equipments indicate a weaker preference than the preference information of the connection request message, and
the transceiver is configured to send a disconnection message to one or more of said user equipments indicating a weaker preference than the preference information of the connection request message.

19. The base station according to claim 14, wherein
the determining unit is further configured to determine load information per cooperation area, and
the transceiver is configured to send the load information from the base station to the requesting user equipment.

20. The base station according to claim 14, wherein the preference information allows performing a proportional fair granting of received connection requests.

21. A user equipment comprising:
an acquiring unit configured to acquire information about one or more reachable cooperation areas;
a determining unit configured to determine cooperation area specific preference information with respect to the one or more reachable cooperation areas;
a transceiver configured to send a connection request message including preference information to one of the one or more reachable cooperation areas; and
a selecting unit configured to select the one cooperation area to which the connection request message was sent if a connection acknowledgement message is received,
wherein the one cooperation area comprises two or more base stations for cooperative multiple input multiple output communication between the two or more base stations with at least one user equipment, and
wherein the preference information comprises information indicative of a measure of aggregated channel quality between a user equipment sending the connection request message and the two or more base stations.

22. The user equipment according to claim 21, further comprising,
a comparing unit configured to check if the measure of connectivity of one other of the one or more reachable cooperation areas exceeds the measure of connectivity of the one selected cooperation area;
wherein the transceiver is configured to send the connection request message to the one other cooperation area the measure of connectivity of which exceeds the measure of connectivity of the one selected cooperation area.

23. The user equipment according to claim 22, configured to check the measures of connectivity in the comparing unit and to send the connection request message when:
a new reachable cooperation area is detected, or
a predefined time period has lapsed, or
the measure of connectivity to the one selected cooperation area falls below a predetermined threshold.

24. The user equipment according to claim 21, the determining unit is further configured to:
receive load information per cooperation area of the one or more reachable cooperation areas; and
decrease the measure of connectivity of the one selected cooperation area when the corresponding load information indicates an increase of load in the one selected cooperation area.

* * * * *